US010817825B2

(12) United States Patent
Shanmugavelayudam et al.

(10) Patent No.: US 10,817,825 B2
(45) Date of Patent: Oct. 27, 2020

(54) REMOTE INTEGRATION OF CLOUD SERVICES AND TRANSPORTABLE PERISHABLE PRODUCTS ACTIVE MONITOR

(71) Applicant: MaxQ Research LLC, Stillwater, OK (US)

(72) Inventors: Saravan Kumar Shanmugavelayudam, Stillwater, OK (US); Shoaib Shaikh, Stillwater, OK (US); Balaji Jayakumar, Stillwater, OK (US); Arif Rahman, Stillwater, OK (US); Trung Dang Nguyen, Stillwater, OK (US)

(73) Assignee: MaxQ Research LLC, Stillwater, OK (US)

( * ) Notice: Subject to any disclaimer, the term of this patent is extended or adjusted under 35 U.S.C. 154(b) by 0 days.

(21) Appl. No.: 16/505,581

(22) Filed: Jul. 8, 2019

(65) Prior Publication Data
US 2020/0210948 A1 Jul. 2, 2020

Related U.S. Application Data

(63) Continuation-in-part of application No. 15/933,055, filed on Mar. 22, 2018, now Pat. No. 10,342,737.

(51) Int. Cl.
*G08B 17/00* (2006.01)
*G06Q 10/08* (2012.01)
(Continued)

(52) U.S. Cl.
CPC ..... *G06Q 10/0832* (2013.01); *G06Q 10/0833* (2013.01); *H04W 4/029* (2018.02); *H04W 52/0235* (2013.01)

(58) Field of Classification Search
CPC .......... G06Q 10/0832; G06Q 10/0833; H04W 4/029; H04W 52/0235
See application file for complete search history.

(56) References Cited

U.S. PATENT DOCUMENTS 5,586,438 A * 12/1996 Fahy ........................ A01N 1/02
435/284.1
6,028,293 A 2/2000 Nagle et al.
(Continued)

FOREIGN PATENT DOCUMENTS

EP 1420573 A1 5/2004

OTHER PUBLICATIONS

MAXQ Research; "Blood Cooler Storage + Transport"; retrieved on Mar. 7, 2018 from http://packmaxq.com/blood-packaging.
(Continued)

*Primary Examiner* — Quang Pham
(74) *Attorney, Agent, or Firm* — Robert H. Frantz; Franklin Gray Patents LLC

(57) ABSTRACT

Status of a payload and a shipping container is tracked and monitored by a tracking module which receives at least one signal from one or more sensors; determines a rate of change over time for the signal(s) and sensor(s); compares, in real-time, memory-stored rate-of-change thresholds corresponding to a payload type to the determined rate(s) of change; and, responsive to the comparison indicating a current or impending violation of a payload handling condition, powers up a wireless communications interface, communicates a digital report to a remote computing system, and powers down the wireless communications interface upon completion of the communicating of the report, while continuing to monitor the sensor(s).

20 Claims, 11 Drawing Sheets

(51) Int. Cl.
*H04W 52/02* (2009.01)
*H04W 4/029* (2018.01)

(56) References Cited

U.S. PATENT DOCUMENTS

| | | | |
|---|---|---|---|
| 6,482,332 B1 | 11/2002 | Malach | |
| 6,673,594 B1* | 1/2004 | Owen | A01N 1/0247 |
| | | | 435/284.1 |
| 7,908,870 B2* | 3/2011 | Williams | F25D 3/08 |
| | | | 62/62 |
| 9,027,782 B1* | 5/2015 | Shanmugavelayudam | |
| | | | B65D 81/3886 |
| | | | 220/592.24 |
| 9,751,682 B2 | 9/2017 | Mayer et al. | |
| 9,798,994 B2 | 10/2017 | Mayer | |
| 2002/0099567 A1 | 7/2002 | Joao | |
| 2004/0151851 A1 | 8/2004 | Miller | |
| 2006/0276768 A1* | 12/2006 | Miller | A61J 1/165 |
| | | | 604/403 |
| 2007/0028642 A1* | 2/2007 | Glade | F25D 3/06 |
| | | | 62/371 |
| 2007/0032774 A1* | 2/2007 | Glade | A61J 1/165 |
| | | | 604/403 |
| 2008/0135564 A1* | 6/2008 | Romero | B65D 81/3827 |
| | | | 220/592.2 |
| 2009/0261549 A1* | 10/2009 | Kral | A61B 1/00144 |
| | | | 280/47.35 |
| 2009/0282192 A1* | 11/2009 | Maus | A61B 5/14532 |
| | | | 711/115 |
| 2010/0028840 A1 | 2/2010 | Brassil | |
| 2010/0076321 A1* | 3/2010 | Zhang | A61B 5/0031 |
| | | | 600/483 |
| 2011/0017831 A1* | 1/2011 | Picon | G06K 19/07749 |
| | | | 235/488 |
| 2011/0029269 A1* | 2/2011 | Hayter | A61B 5/4839 |
| | | | 702/104 |
| 2011/0082437 A1* | 4/2011 | Stacey | F25D 15/00 |
| | | | 604/404 |
| 2011/0175739 A1* | 7/2011 | McFeeters | G08B 29/185 |
| | | | 340/584 |
| 2011/0304833 A1* | 12/2011 | Osaka | H04M 1/0202 |
| | | | 353/85 |
| 2012/0046792 A1* | 2/2012 | Secor | G05B 19/042 |
| | | | 700/276 |
| 2012/0126702 A1* | 5/2012 | Basauri | H05B 45/00 |
| | | | 315/112 |
| 2012/0197810 A1* | 8/2012 | Haarmann | F25D 3/08 |
| | | | 705/302 |
| 2012/0210498 A1* | 8/2012 | MacK | A42B 3/0466 |
| | | | 2/414 |
| 2012/0281101 A1* | 11/2012 | Fujinawa | H04N 5/907 |
| | | | 348/207.1 |
| 2013/0289927 A1 | 10/2013 | Smith et al. | |
| 2014/0350720 A1* | 11/2014 | Lehmann | G07F 11/62 |
| | | | 700/236 |
| 2015/0038855 A1* | 2/2015 | Berckmans | A61B 5/18 |
| | | | 600/483 |
| 2015/0192475 A1* | 7/2015 | Eisenstadt | G01K 1/02 |
| | | | 340/870.17 |
| 2015/0241120 A1 | 8/2015 | Mayer | |
| 2015/0310174 A1* | 10/2015 | Coudert | G06F 16/22 |
| | | | 705/3 |
| 2016/0232877 A1* | 8/2016 | Cho | F25D 25/005 |
| 2016/0266206 A1* | 9/2016 | Thompson | G01R 31/50 |
| 2016/0306636 A1* | 10/2016 | Nguyen | G06F 9/4411 |
| 2017/0056289 A1* | 3/2017 | Tsuno | F25D 11/003 |
| 2018/0010978 A1* | 1/2018 | Bailey | G01M 3/2807 |
| 2018/0020643 A1* | 1/2018 | Duan et al. | G06K 7/10366 |
| | | | 340/573.3 |
| 2018/0055457 A1* | 3/2018 | Balboni | A61B 5/7282 |
| 2018/0246516 A1* | 8/2018 | Franzius | G05D 1/0221 |
| 2019/0025148 A1* | 1/2019 | Tombak | G01M 3/002 |
| 2019/0273374 A1* | 9/2019 | Burnett | H01G 2/08 |
| 2019/0301480 A1* | 10/2019 | Ojima | F04D 15/0088 |
| 2019/0317488 A1* | 10/2019 | Al-Maghlouth | F04D 15/0088 |

OTHER PUBLICATIONS

MAXQ Research; "Donor Tub Shipper", retrieved on Mar. 7, 2018 from http://packmaxq.com/blood-packaging.
MAXQ Research; "Platelet Shipper", retrieved on Mar. 7, 2018 from http://packmaxq.com/blood-packaging.
MAXQ Research; "Red Blood Cell Shipper", retrieved on Mar. 7, 2018 from http://packmaxq.com/blood-packaging.
MAXQ Research; "Improving the Blood Supply Chain with Advanced Shipping and Storage Materials", published online Oct. 2017.
MAXQ Research; "Package design, testing & evaluation", retrieved on Mar. 7, 2018 from http://packmaxq.com/blood-packaging.
Fadeyi, et al.; "Implementaiton of a new blood carrier cooler insert and tracking technology with educational initiatives and its effect on reducing red blood cell wastage"; vol. 57, Oct. 2017, Transfusion, pp. 2477-2482.
Temptime; Cooler validation survey results—Mar. 2012; retrieved on Mar. 21, 2018 from http://williamlabs.com/aabb-topics-guidelines/cooler-validation-survey-results-march-2012/.
Coolpac; "Blood Transport & Validated Temperature Controlled Packaging", retrieved on Feb. 19, 2018 from http://coolpac.com.
Omega; "Temperature monitoring during transportation, storage and processing of perishable products"; retrieved on Feb. 19, 2018 from https://www.omega.com.
Badia-Melis, et al.; "Refrigerated fruit storage monitoring combining two different wireless sensing technologies: RFID and WSN", Sensors, 2015, vol. 15, pp. 4781-4795.
Pelican Biothermal; "Glossary", retrieved from http://pelicanbiothermal.com on Feb. 19, 2018.
Pelican Biothermal; "Blood Supplies", retrieved from http://pelicanbiothermal.com on Feb. 19, 2018.
Polar Tech; "Insulated shipping kit, . . . ", retrieved from https://www.grainger.com on Feb. 19, 2018.
True Pack; "Blood Shippers", retrieved on Feb. 19, 2018 from http://www.truepack.com.
Swedberg, Claire; "Wake Forest Baptist develops system for tracking blood temperature", RFID Journal, 2011.
Tech Instrumentation; "TRIX-8 Data Logger", retrieved on Feb. 19, 2018 from http://techinstrument.com.
SIMCom Wireless Solutions; "Wireless Module Solutions".
World Health Organization; "Annex 9: Model guidance for the storage and transport of time- and Temperature-sensitive pharmaceutical products", No. 961, 2011.
USPTO; first Office Action dated Aug. 23, 2018 in related U.S. Appl. No. 15/933,055.
Shanmugavelayudam et al.; Applicant's reply, submitted on Nov. 22, 2018, to first Office Action in related U.S. Appl. No. 15/933,055.
USPTO; Notice of Allowance dated Feb. 27, 2019 in related U.S. Appl. No. 15/933,055.

* cited by examiner

Blood Storage and Transportation Requirements

| Blood Product | Condition | Temperature Range | Transport/ Storage Time | Transport/ Storage Equipment |
|---|---|---|---|---|
| Whole blood and packed red cell | For transport to another center (steps 202, 204) | +1 °C to +10 °C | Depends on qualified duration of the container | Qualified container having sufficient cooling materials |
| Whole blood and packed red cell | For storage in blood center (steps 203, 205) | +1 °C to +6 °C | 35 days | Blood bank / Hospital refrigerator |
| Platelet concentrates | For transportation to another center (step 204) | +20 °C to +24 °C | 24 hours (maximum time without agitation) | Qualified container having sufficient temperature stabilization materials |
| Platelet concentrates | For storage in blood center (steps 203, 205) | +20 °C to +24 °C | 5 to 7 days | Platelet incubator with agitator |
| Fresh frozen plasma | For storage in blood center (steps 203, 205) | Frozen state (below -18 °C) | 12 months from collection | Plasma freezer |
| Fresh frozen plasma | For transport to another center (step 204) | Frozen state | Transported until maintained in frozen state | Qualified container having sufficient cooling materials |
| Packed red cells, thawed plasma | Blood components issued for transfusion (step 206) | +1 °C to +6 °C | Depends on qualified storage duration of the cooler | Portable coolers |

Sources: AABB, WHO

Fig. 3

REMOTE INTEGRATION OF CLOUD SERVICES AND TRANSPORTABLE PERISHABLE PRODUCTS ACTIVE MONITOR

CROSS-REFERENCE TO RELATED APPLICATIONS CLAIMING BENEFIT UNDER 35 U.S.C. 120

This is a continuation-in-part (CIP) patent application of U.S. patent application Ser. No. 15/933,055, filed on Mar. 22, 2018, et al.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to condition monitoring, reporting, and automated remedial actions for the transport of perishable materials such as blood, tissue, organs, biologics, pharmaceuticals, specimens, foods, and chemicals.

BACKGROUND OF INVENTION

Blood and blood products must go through a series of steps before they are transfused into the patient. This is known as the "blood transfusion supply chain", which may be defined as a temperature-controlled supply chain. At each step in the blood supply chain, precise temperatures must be maintained to ensure the integrity of the blood products. If the blood or blood product (e.g., component) is allowed to become too cold or too warm, then the blood products may become unusable. Other perishable products, such as tissues, organs, biological samples, food and food components, and certain chemicals share similar requirements to maintain temperature within a certain range during storage and transport.

SUMMARY OF THE INVENTION

Status of a payload and a shipping container is tracked and monitored by a tracking module which receives at least one signal from one or more sensors; determines a rate of change over time for the signal(s) and sensor(s); compares, in real-time, memory-stored rate-of-change thresholds corresponding to a payload type to the determined rate(s) of change; and, responsive to the comparison indicating a current or impending violation of a payload handling condition, powers up a wireless communications interface, communicates a digital report to a remote computing system, and powers down the wireless communications interface upon completion of the communicating of the report, while continuing to monitor the sensor(s).

BRIEF DESCRIPTION OF THE DRAWINGS

The description set forth herein is illustrated by the several drawings.

FIG. 3 sets forth an exemplary set of pre-determined storage and handling thresholds (temperature, accrued time, etc.) for a plurality of specific payload types (blood products) for encoded into one or more computer-readable memory devices according to at least one embodiment of the present invention.

DETAILED DESCRIPTION OF EMBODIMENT(S) OF THE INVENTION

The inventors of the present invention have recognized a problem not yet recognized or solved by those skilled in the relevant arts. Blood banks, diagnostic labs, and hospitals often use blood transport and storage systems, containers, and enclosures that may not have been designed or ideally suited for that purpose. This creates inefficiencies in handling, and requires time-consuming validation to remain compliant with regulations. Blood products are costly, and any spoilage can cause shortages and put human lives at risk. And any avoidable losses affect the financial results for the blood banks and hospitals handling those products. The inventors have recognized that a more reliable, cost-effective solution for transporting blood products is needed. The present invention provides certain technological improvements for this purpose.

Figure 2:
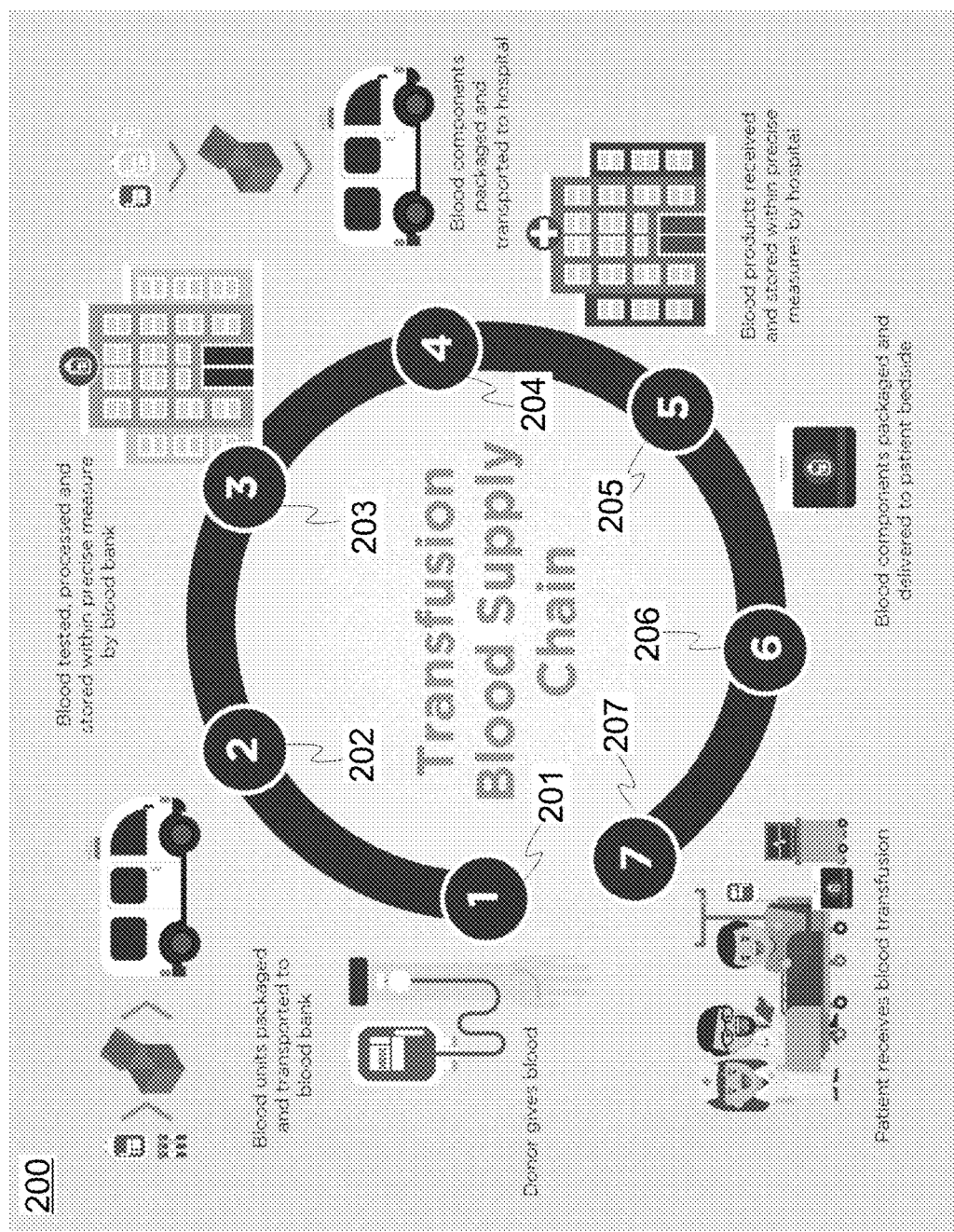
FIG. 2 depicts a typical blood supply chain.

The inventors have realized that the modern blood supply chain includes at least seven (7) points of failure where any delays, miscommunications, or procedural issues can cause serious problems with the quality and usability of the blood product. As shown in FIG. 2, steps in the modern blood supply chain (200) typically include, but are not limited to:
- (201) The donor gives blood.
- (202) After donation, blood units and donor blood specimens are placed into storage containers and transported to the blood bank which may be many miles away.

(203) At the blood bank, the blood is tested, processed, and stored according to precise specifications determined by the blood bank in compliance with corporate, state, national, international and/or association standards, such as the standards promulgated by the American Association of Blood Banks (AABB) in the United States.

(204) When ordered, blood products are again placed within cold storage containers and transported to the hospital or other location where blood is needed.

(205) When received by the hospital, the blood products are again stored according to precise specifications determined by the hospital in compliance with the relevant storage and handling standards.

(206) When ordered by the physician, blood products are packaged and delivered to the patient's bedside.

(207) Finally, the blood is transfused into the patient as needed, over a period of time, during which time additional units of blood may be stored next to the patient's bed while the patient receives a unit via transfusion.

Each of these seven generalized steps represents a possible point of failure where any delays, miscommunications, or procedural issues can cause serious problems. Further, some units of blood or blood components may be returned to the blood bank, such as when the patient no longer requires the blood products. However, return and restocking of blood products requires a number of conditions to be met by most handling and storage standards:

(a) The container closure has not been disturbed.
(b) The appropriate temperature range has been maintained.
(c) For red blood cell components, at least one sealed segment of integral donor tubing has remained attached to the bag. Removed segments shall be reattached only after confirming that the tubing identification numbers on both the removed segment(s) and the bag are identical, and
(d) The storage, handling and transportation records indicate that the blood, blood component, tissue, or derivatives have been inspected and that they are acceptable for reissue.

Figure 10:
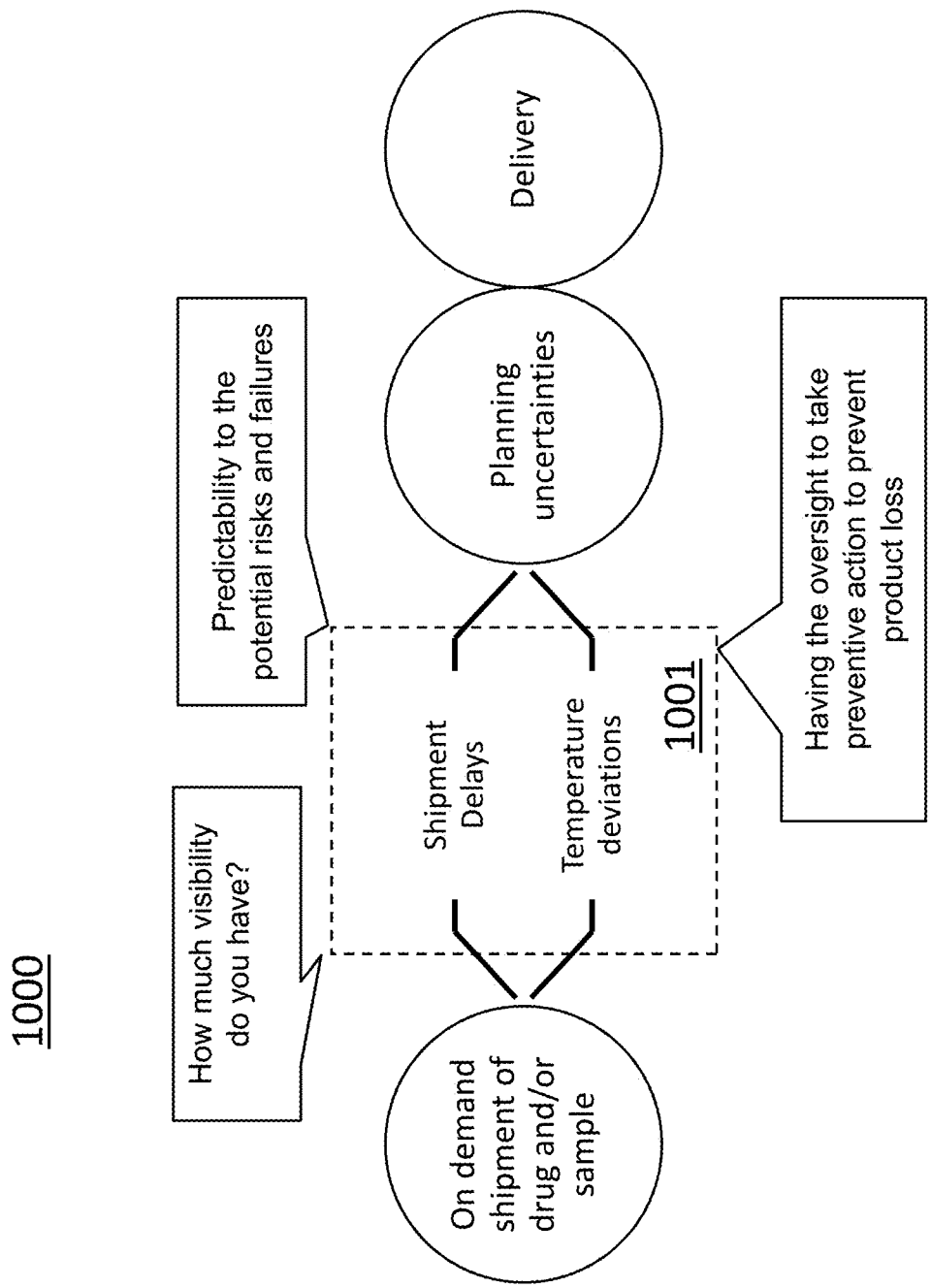
FIG. 10 illustrates the gap in visibility in the storage and transportation processes addressed by embodiments of the present invention.

The present invention addresses a gap (1001) in the supply chain (200), as shown in FIG. 10. For example, shipment delays and temperature deviations can cause planning uncertainties and failures to deliver critical, perishable goods, such as blood and blood products, medicines, biological samples, etc. The inventors of the present invention have realized that several key criteria comprise this gap:

(a) how much visibility does a supplier or shipper have into the conditions of the perishable products at any particular time in transit?
(b) can the risks to successful delivery be predicted, and if so, avoided or corrected, mid-transit?
(c) will oversight of this information enable preventative action beyond just corrective action?

For the purposes of this disclosure, the term "visibility" shall refer to data collection in real-time or near-real-time, such as event-driven data collection, during the process of transporting and/or storing a perishable good, such as blood products. While some systems exist to provide "visibility" to past events, such as a data loggers which can be downloaded after the shipment arrives at its destination to determine if the shipment was mishandled or spoiled during shipment or storage, the present inventors believe this limited, post-event visibility contributes to the gap in knowledge during transit or storage.

Also for the purposes of this disclosure, the term "predict" shall refer to the use of rules, extrapolations, and learned patterns which can assist in evaluation of real-time or near-real-time conditions which are not yet out of tolerance, but which may reach limits according to the rules, extrapolations and/or learned patterns, as will be disclosed in more details in the following paragraphs.

Further, for the purposes of the present disclosure, the terms "avoided", "corrected", mid-transit, mid-storage, preventative action and corrective action shall refer to actions taken based on the real-time or near-real-time visibility into the conditions of a shipment of perishable goods, including, but not limited to, re-routing a shipment in mid-transit to avoid adverse conditions such as temperature or time delays, dispatching a replacement good in advance of a spoiled or mishandled good arriving at its destination pre-emptively, and avoiding routes, carriers, depots, switching points, handlers, and modes of transportation which have an established, determined pattern of failing to complete a storage or transit within allowable limits The Related Invention The present invention can be realized as an improvement to a related invention, disclosed in the parent application. Those ordinarily skilled in the art will recognize that other embodiments according to the present invention may be realized by improving other portable data logging and cargo monitoring systems, as well. So, for the purposes of this patent disclosure, an embodiment is disclosed relative to the related patent application, without limitation to its potential application to other data logging and cargo monitoring devices and systems.

Blood products represent an expensive and labor-intensive resource, reportedly accounting for approximately 1% of hospital expenditures. Yet the transportation and storage of blood products is often an inefficient and costly process. This is due to the complexity of the supply chain: the series of refrigerated production, storage and distribution activities, equipment, and logistics required to maintain a desired low-temperature range.

As shown in FIG. 3 and according to the AABB and the World Health Organization (WHO), blood products must be maintained within a critical range of temperatures during a short timeframe to remain viable. The steps listed under "Condition" in FIG. 3 refer to the steps in the blood supply chain shown in FIG. 2.

These include five out of seven steps where delays, miscommunications, or procedural issues can cause blood products to go out of safe temperature range. This is also true for blood and blood components being returned to the blood bank or transfusion service.

Red blood cell (RBC) product wastage in hospitals is reported to range anywhere from 0.1% to 6.7%. In one study, approximately 87% of wasted RBC units were either individual units that were out of blood bank for more than 30 minutes (dispensed but not administered) or units packed in transport containers with temperature indicators affixed to each unit.

Factors identified as contributors to RBC wastage most amenable to improvement were lack of awareness and training of staff ordering and handling RBC products, management of temperature-validated containers, inconsistent interpretation of RBC temperature indicators, and need for accountability when ordering blood products.

The cost of blood wastage is significant. In the National Blood Collection Utilization Survey in 2011, the annual direct cost of intraoperative RBC wastage at one medical center was reported to have amounted to approximately $249,000 2010, based on a direct cost of $225 per unit of leuko-reduced RBCs, excluding costs associated with the procurement, management, storage, and issue of these products. In other reports, the comprehensive cost of a unit of transfused RBC can range between $1,800 to $3,000 per unit.

The present inventors have recognized the following shortcomings in the blood chain management equipment, systems, technologies, and procedures which are in current use. Cardboard boxes lined with foam insulation on the inside or molded plastic coolers such as a recreational storage boxes made by Igloo™ are the industry standard components employed for packaging and storage of temperature sensitive products in this blood transfusion supply chain. The many drawbacks recognized by the inventors to these existing blood chain management equipment, systems, technologies, and procedures, can be categorized as follows:

Inconsistent thermal properties leading to low quality or low effectiveness;

Lack of payload status monitoring and feedback to the end user;

No built-in feedback mechanism that can provide payload efficacy status;

Time-consuming and laborious compliance or validation processes; and

Excessive costs, including shipping.

Consumer-grade coolers, such as those manufactured by Igloo™, Rubbermaid™, etc., which are often used for internal transport within hospitals, are generally fabricated from high-density plastic lined with 1.5 to 3 inches of foam insulation, and then the interior of the cooler is filled with crushed ice, leaving only 20% to 30% of the interior volume usable for storage and transport of blood products. Most of these consumer-market coolers are not designed for precision insulating, so they have non-uniform temperature distribution with hot and cold zones within them. Whereas the manufacturers of these coolers are unaware of their potential use for life-saving purposes, the manufacturing of these coolers is potentially widely variable over time and production runs. The typical foam-lined cardboard box uses Styrofoam with just insulation rating of R3 to R4 per inch, or polyisocyanurate with R5 to R7 per inch. While these boxes are low-cost, they provide limited performance in demanding settings, such as longer transport times, or storage at the bedside of a patient who requires continuous lower-volume transfusions. Additionally, because different blood products require different temperature ranges for packaging, the insulation, cooling material, and pack-out of each blood product must be varied based on the type of blood product being packaged and transported, leading to unnecessary complexity in procedures as well as increased possibility of human error leading to damage of the blood product. Still further, the existing materials and procedures used by blood banks and hospitals have little flexibility to size up or down according to the requirements of each shipment. This adds even more inefficiencies and higher costs.

Finally, the present inventors have taken notice that many blood banks and hospitals today use an arbitrary collection of packaging materials that requires an extensive set of pack-out evaluations.

To solve these shortcomings, the present inventors set out to design and verify blood chain management equipment, technologies, and procedures which provide a pre-validated system of integrated packaging and components that are faster and simpler to evaluate, use, and comply with applicable standards and procedures.

Figure 4:
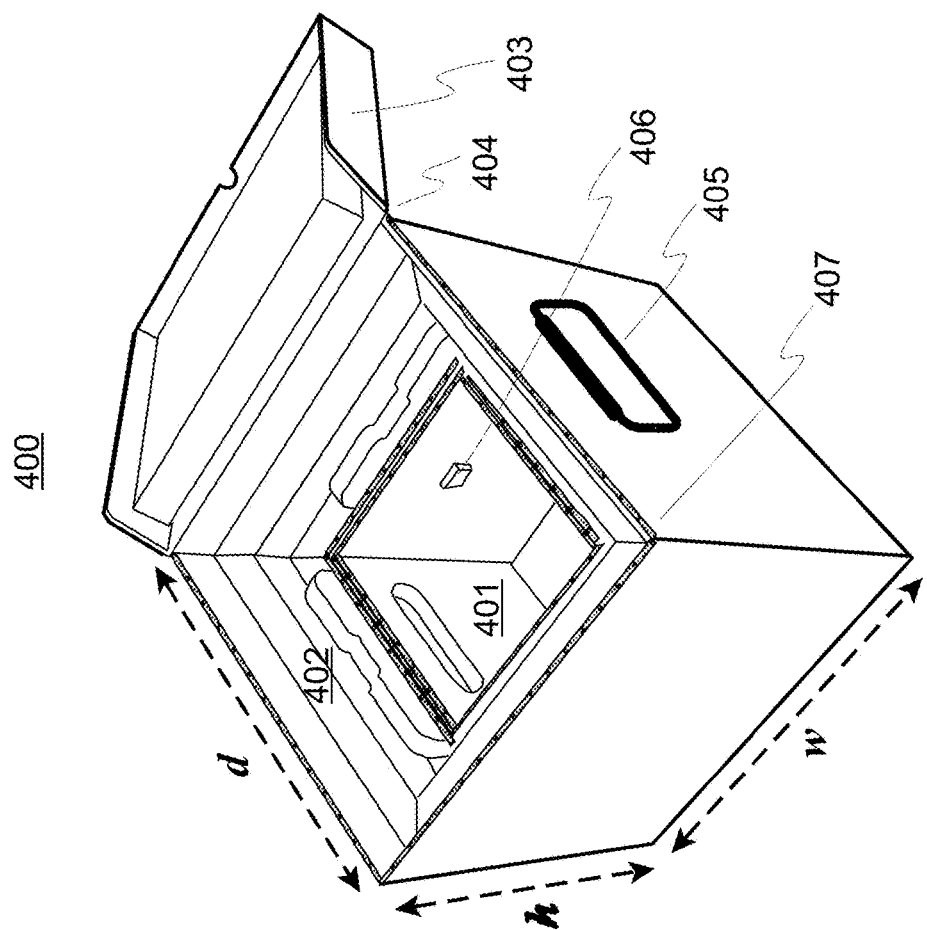
FIG. 4 provides a photograph of a prototype according to at least one embodiment of the present invention with the lid open, a payload carrier received into the interior of the container, and four cooling packs installed between the payload carrier and between the insulated walls of the container.

FIG. 4 illustrates an advanced blood transport container (400) from MaxQ Research LLC of Stillwater, Okla., in a condition with a top or lid (403) open, which has external dimensions of 13.25" for width w, height h and depth d. A payload carrier (401) has dimensions of 10" for width, height, and depth. The payload carrier is surrounded by one or more layers of corrugated plastic side panels, back panel, and front panel, with one or more layers of insulation material, and one or more layers of freezable packs (water, gel, phase change, etc.). A top (403) is attached to the rear panel by a thermoplastic hinge (404), and the top has a lip around the side edges and front edge which descends downward when closed to surround the top edge of the side panels and front panel. This particular transport container is also provided with a pair of handles (405) on the left and right sides for each of lifting and moving the loaded container. While this transport carrier will be used to illustrate one particular embodiment of the present invention, and while this particular structure itself is new and novel, other embodiments of the present invention may be realized with other transport and storage containers, such as those mentioned in the foregoing paragraphs.

Figure 5:
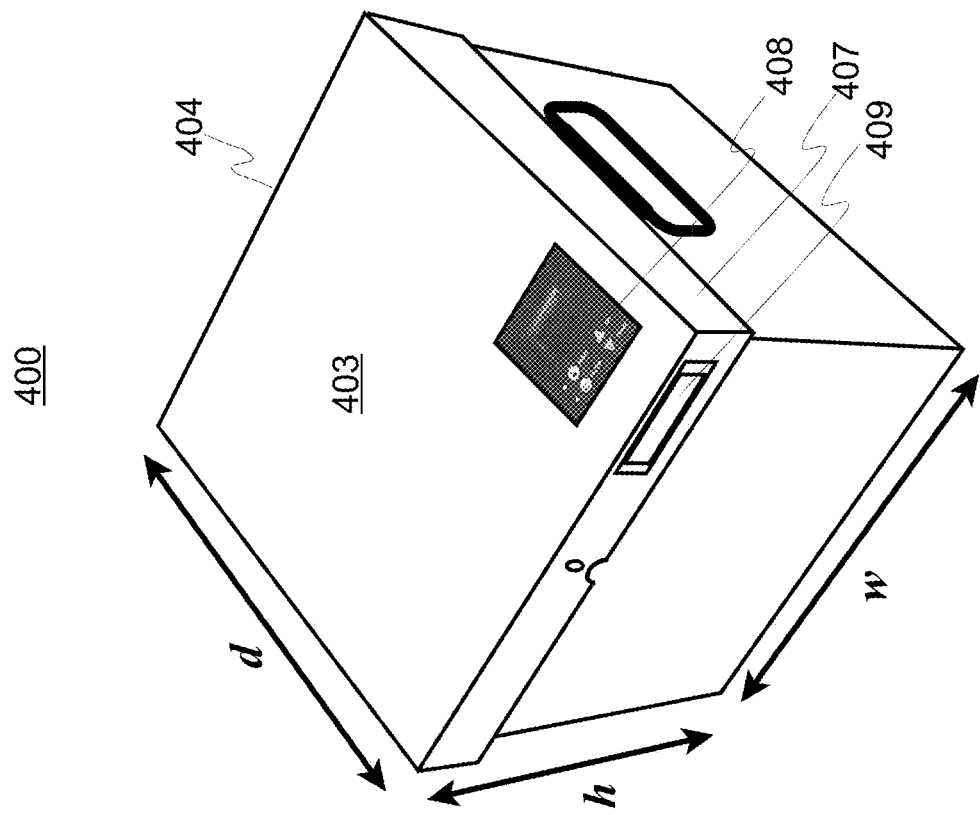
FIG. 5 provides a photograph of the same prototype of FIG. 4, with the lid closed, illustrating an exemplary location of the tracking module, user interface, and lid status sensor.

The present exemplary embodiment is realized by several improvements and modifications to the transport container (400), including the addition of at least one concealed magnet (407), preferably at the front right corner of the container. Further, the payload carrier (401) is improved to have at least one temperature sensor (406), and optionally other sensor types (humidity, pressure, shock, etc.), preferably at a position towards the geometric center of the rear panel of the payload carrier (401). And, as shown in FIG. 5 with the transport container (400) lid (403) in a closed position, a small electronic tracking module (408) with an optional user interface is disposed in the front right corner such that a Hall effect sensor within the module can sense the proximity of the magnet (407), thereby sensing closure of the lid (403). Additionally, in this exemplary embodiment, an access port (409) is provided through the lip of the lid to allow for connections such as a charging connector, a data connector, and a removable memory card.

Other placements of the tracking module, payload sensor, and closure sensor are available in other embodiments, as are other means for sensing closure of the lid, such as but not limited to near field communications (NFC), momentary switches, optical sensors, etc. This particular arrangement of placements has the advantage that no external cabling or wiring is necessary to connect the closure sensor to the tracking module, and the weight of the tracking module assists in pressing the lid downwards to provide a better thermal seal when a user casually flips the lid closed without making a deliberate effort to press the lid fully closed and/or to secure the lid's latch.

In this configuration, testing of a prototype confirms that the fully integrated wireless payload temperature monitoring system with a calibrated sensor location reduces user error and hot/cold measurement bias, with built-in memory capable of continuous recording of payload temperature, can generate a detailed payload temperature history report after every trip, can be validated for storing refrigerated blood products (RBC, plasma) for over 24 hours. This specific embodiment has a capacity of 1 to 8 units of blood products, can maintain the temperature of the payload between 1-6 degrees Centigrade (° C.) for 24 hours or more, and can accurately measure and record payload temperature using a National Institute of Standards and Technology (NIST)

traceable temperature sensor (−40 to +125° C., accuracy of ±0.3° C., resolution of 0.01° C.). The continuous payload temperature recording allows for user defined recording intervals, preferably minimum 2 minutes, and the tracking module provides audible and visual temperature excursion alarms. The open/close sensor and record generator provides useful chain of custody records by time stamping of every lid open event.

In the tested prototype, a rechargeable LiPo battery lasted up to 2 weeks. And, an O-LED display provided status read out, payload temperature, payload status (acceptable or not acceptable) compared to predetermined payload-specific thresholds, and a battery level indicator. A removable secure digital (SD) memory card was capable of storing data for up to 1 month at 2 minute recording intervals. An application program running on a mobile computing device (Android™, iOS™, Windows™, etc.) could wirelessly interface to the tracking module using its on-board Bluetooth low energy (BLE) communication link, allowing for a full suite of mobile applications and data management, such as current payload status, snap shot graph or list of payload temperature history, and exporting payload temperature history.

Figure 6:
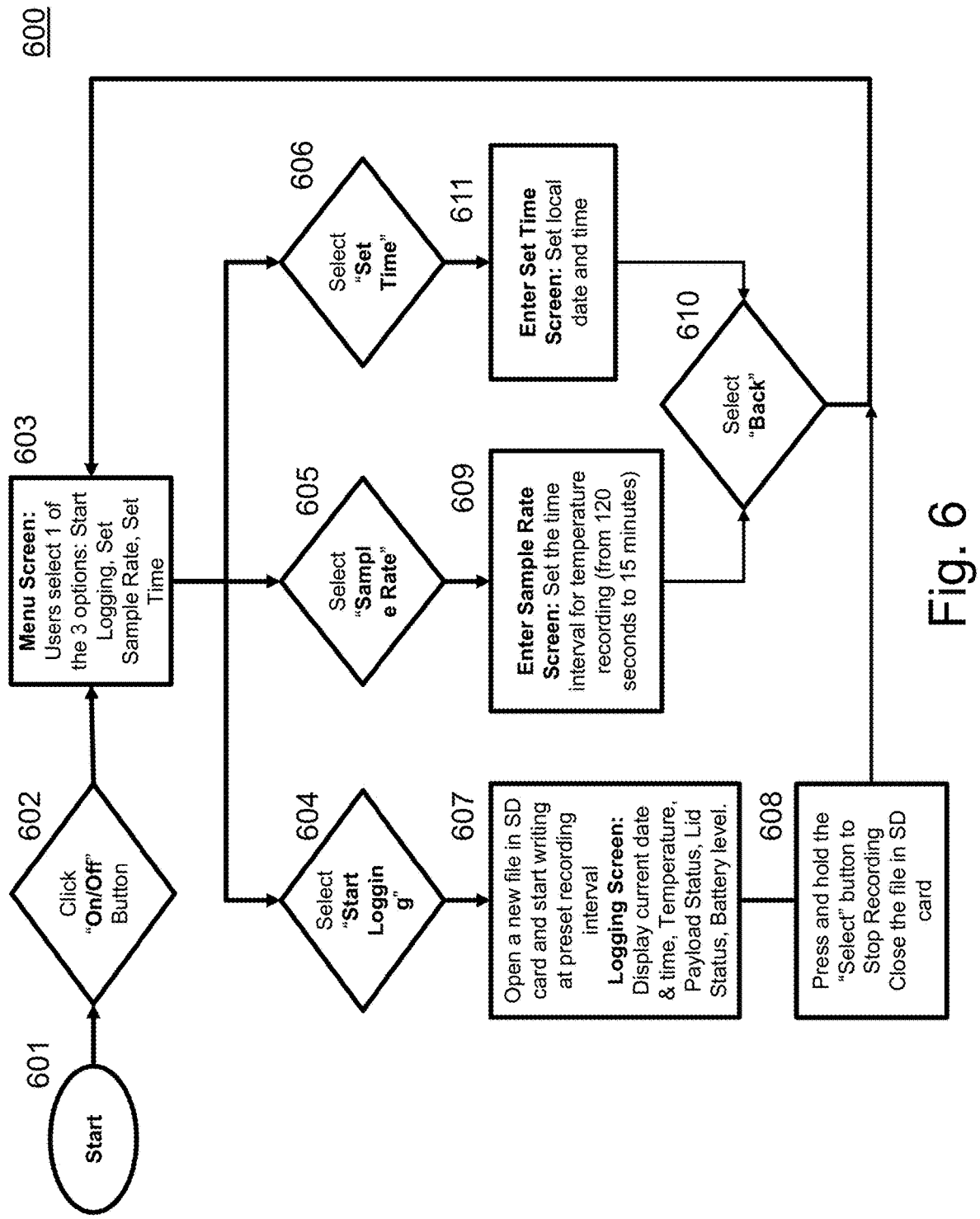
FIG. 6 shows an exemplary process for providing basic user interface functions and tracking the environmental conditions of the payload.

FIG. 6 sets forth an exemplary logical process (600) for the tracking module which can be executed by a processor with memory-stored firmware, by programmable logic circuitry, by custom logic circuitry, or by a combination of the foregoing electronic elements, to implement a user interface menu system. This particular embodiment starts (601) upon application of power from a power source (battery, solar cell, power adapter, etc.) and the clicking of an On/Off button (602) by the user to put the tracking module into a fully operational mode. Optionally, when the tracking module is in the "off" mode, it may be placed into a lower power mode in which some components and subsystems are placed in a sleep or dormant mode, while other components and subsystems are still in a functioning mode, such as a wireless interface or a timer-interrupt circuit.

Upon clicking the On button, a menu screen is displayed (603), which allows the user to start a new logging session (604), to adjust the sample rate or interval (605), or to set the system time (606). If the option to start a new logging session is selected, a new data file is opened (607), and the display is updated to remove the menu and show relevant real-time information, such as the system time, the temperature reading(s) of the sensor(s), the status of the payload (acceptable/not acceptable), the battery level, the lid status (open/close), the elapsed time, other optional sensor and interface statuses (shock sensor, humidity level, GPS status, Wi-Fi connection mode, BLE mode, etc.). Logging into the open file and updating of the menu may continue until the "select" button is pressed and held for a minimum period of time, at which time, logging is completed, and the file is closed and finalized. To conserve battery power, and depending on the display type, the display may be blanked, cleared, or turned off after a period of inactivity at the user interface buttons, and then re-enabled when any button is pressed, the lid is opened, the payload status becomes unacceptable or nearly unacceptable, etc.

If, at the main menu (603) the user selects the option to set the sample rate or interval (605), the display is updated to allow the user to enter a sample rate or interval, such as by scrolling up and down through values and hitting select. Optionally, the minimum sample rate (samples per second) or maximum sample interval (seconds between samples) can be enforced according to a predetermined value recorded in system memory according to the type of payload being conveyed, to prevent the user from selecting a value which is not compliant with a relevant handling and storage standard or requirement value. The user can return (610) to the main menu (603) when finished setting this value.

If, at the main menu (603) the user selects the option to set the system time (606), the display is updated to allow the user to enter time and date values, or to select an automatically-determined time value such as a time received from a Global Positioning System (GPS), application running on a nearby paired mobile computing device, etc. Optionally, if the tracking module is currently logging (607) sensor values and events, the user may be prohibited from changing the system time, or the system may record an event into the log of the current time before changing the system clock and the value set by the user after the change for traceability and for meeting of standards regarding maximum time in transit for a particular type of product being conveyed.

Figure 9:
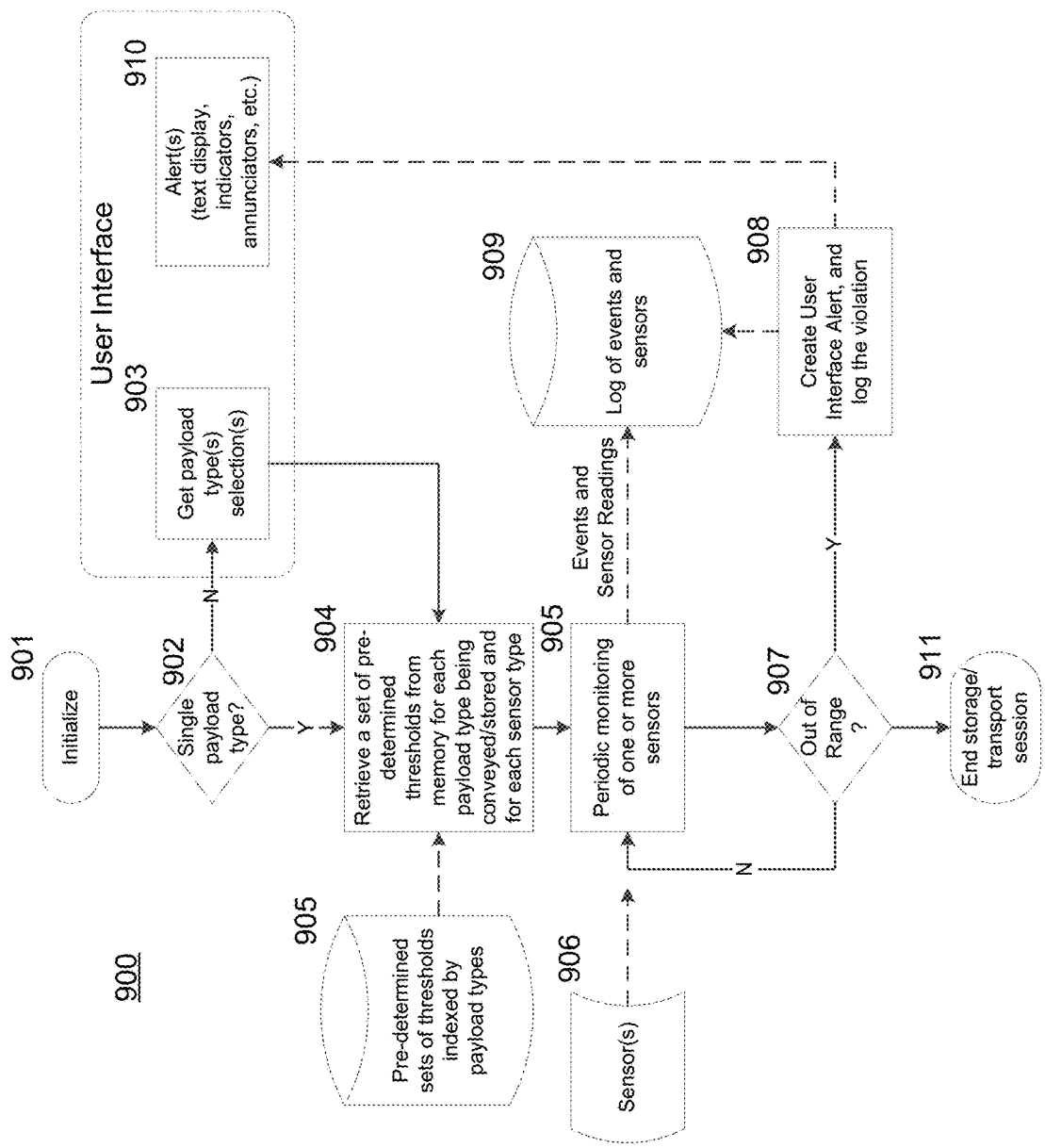
FIG. 9 illustrates an exemplary logical process for monitoring one or more sensors and providing logging and alerting for payloads which have been subjected to conditions which may cause their condition to be unacceptable.

FIG. 9 sets forth an exemplary logical process (900) for the tracking module which can be executed by a processor with memory-stored firmware, by programmable logic circuitry, by custom logic circuitry, or by a combination of the foregoing electronic elements, to implement a real-time monitoring of one or more sensor types for at least one type of payload, and optionally, for a variety of payload types. After initialization (901), a check (902) may be made to see if this particular embodiment supports two or more payload types. Some embodiments may be restricted to a single payload type, and if so, those embodiments would go directly to retrieving (904) the pre-determined thresholds (905) for at least one sensor type (e.g., temperature), and optionally, multiple sensor types (e.g., additional temperature sensors, shock sensors, access panel open/close sensors, etc.).

Each sensor (906) is sampled (905) periodically, potentially on different periods or rates for different sensor locations and types. Each sensor reading and detected event is added to the open log memory file (909). If any sensor reading is detected (907) to be out of acceptable range (905) corresponding to the sensor location, sensor type, and payload type, then an alert such as a flashing LED, text string on a display and/or annunciator (buzzer, etc.) is activated (910), and the condition is logged (909). This monitoring (905, 907), logging (909) and alerting (910) continues until the storage or transportation of the payload is complete (911).

Figure 1:
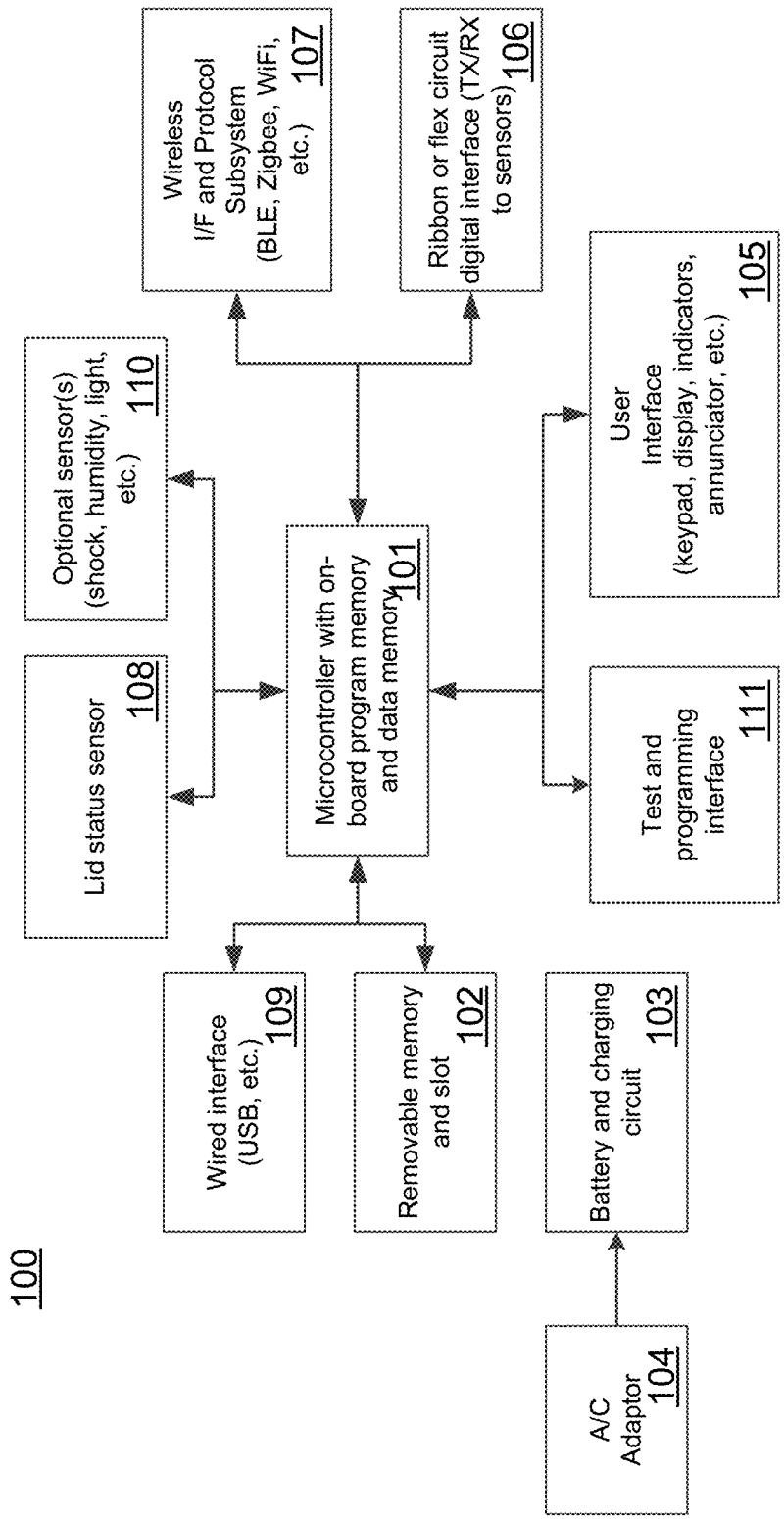
FIG. 1 illustrates a functional block diagram of a tracking module according to at least one exemplary embodiment of the present invention.

FIG. 1 illustrates a block diagram of an exemplary embodiment (100) according to the present invention of the circuitry for the tracking module. The present inventors recommend, and used in a tested prototype, a low-power microcontroller (101) which has on-board program memory and local data memory, and which can be programmed, controlled, and/or debugged via a test connector (111). Such microprocessors typically have on-board or built-in clocks, calendars, sleep timers, and sometimes, serial communications interfaces. Other embodiments may use less integrated processor architectures, of course. Power for the tracking module, as built and tested, included an integrated battery (103), which was rechargeable via an A/C adaptor (104), and which provided a battery status indicator directly from the charging circuit (103) to the microcontroller (101). Other embodiments may include a removable battery, solar cell power source, solar charging circuit, and inductive charging circuits.

A wireless interface (107) in the prototype included a Bluetooth Low Energy (BLE) interface, and in other embodiments, may include networking interfaces (WiFi, Cellular, etc.), other short-range wireless interfaces (Zigbee™, InfraRed Data Arrangement (IrDA), etc.), as well as wired interfaces (109) (Universal Serial Bus (USB), Ethernet, etc.). These communications interfaces allow for the tracking module to communicate with application programs running on nearby mobile computing devices (smart phones, tablet and laptop computers, etc.) as well as with server computers (cloud servers, Internet-of-Things (IOT) servers, etc.). Such application programs may collect the logged data on real-time status, locally or remotely, and may coordinate and facilitate additional business and technical functions, such as supply chain tracking, inventory management, etc.

The lid status sensor (108), such as a Hall-effect sensor mechanically positioned near the magnet embedded in the upper edge of the container, may send its status to the microcontroller (101) to allow the process to detect and time the openings and closings of the lid, to create records of such in the log on the removable memory card, and to cause alerts to be seen and heard via the user interface (105), as previously discussed, if the lid remains open too long, the payload status is nearing or has reached unacceptable levels, etc.

The user interface (105) is further used to receive user input and commands, such as those previously discussed with respect to FIG. 6, and to provide real-time sensor and status information to the user (temperatures, time in transit/storage, lid status, battery level, etc.) as well as to cause alerting when the process has detected the payload is near or has exceeded acceptable limits.

The tracking module is further provided with payload-specific predetermined storage and handling limits, such as those shown in FIG. 3. In some embodiments, the tracking module may be programmed with a single set of storage and handling limits for a single payload type, and the container may be marked or otherwise color coded to indicate that it is only appropriate for storing and transporting that single payload type, such as "Whole Blood and Packed Red Cells ONLY." In other embodiments, the user may be provided a menu or the connected application program which may allow for the selection of one of several sets of storage and handling limits, which are stored in the tracking module's memory, based upon the type of payload to be conveyed in the current shipment. The payload status is then generated by the processor and process based on the logged conditions (temperature, time in transit, shock, lid status, etc.) for the specific payload type being conveyed, and the appropriate alarms are issued to the user corresponding to the specific set of limits for the specific payload.

Figure 7:
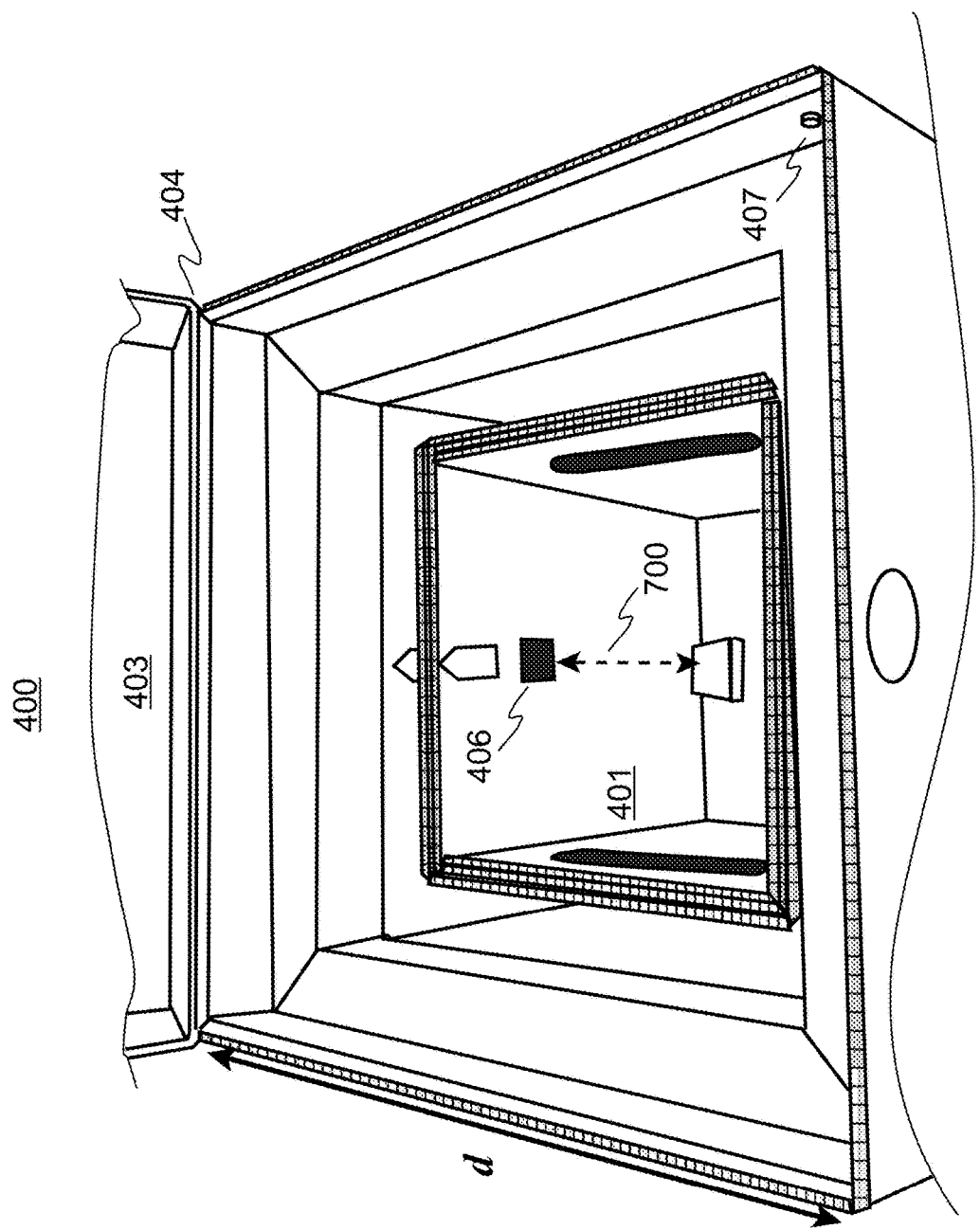
FIG. 7 illustrates sensor placement in the payload carrier of the prototype of FIG. 4.

A particularly useful aspect of the prototype tested was a quick disconnect for the temperature sensor in the payload carrier to the tracking module. Rather than require the user to place the sensor within the payload, or require the user to connect cables or wires for the sensor, the sensor was affixed to a position (406) essentially in the center of the back panel of the removable payload carrier (401). In this particular embodiment, the optimal sensor location was determined based on thermal mapping of the container through mathematical models and validation through actual test results. The sensor used was of a type that had an integrated sensor, analog-to-digital converter, and digital communication path drivers in a single component such that a flat flex cable carrying sensor data values (samples) could be embedded in the back panel of the removable payload carrier (shown by dotted path 700 in FIG. 7). As the flat flex circuit (or ribbon cable) reached the bottom of the back panel of the payload carrier, it was wrapped around the corner and connected to a first part of a multi-contact connector that consisted of spring-loaded pins. In other embodiments, the sensor may be provided with a wireless interface device, such as a near-field communication (NFC), Bluetooth Low-Energy (BLE)™ or Zigbee™ interface.

Figure 8:
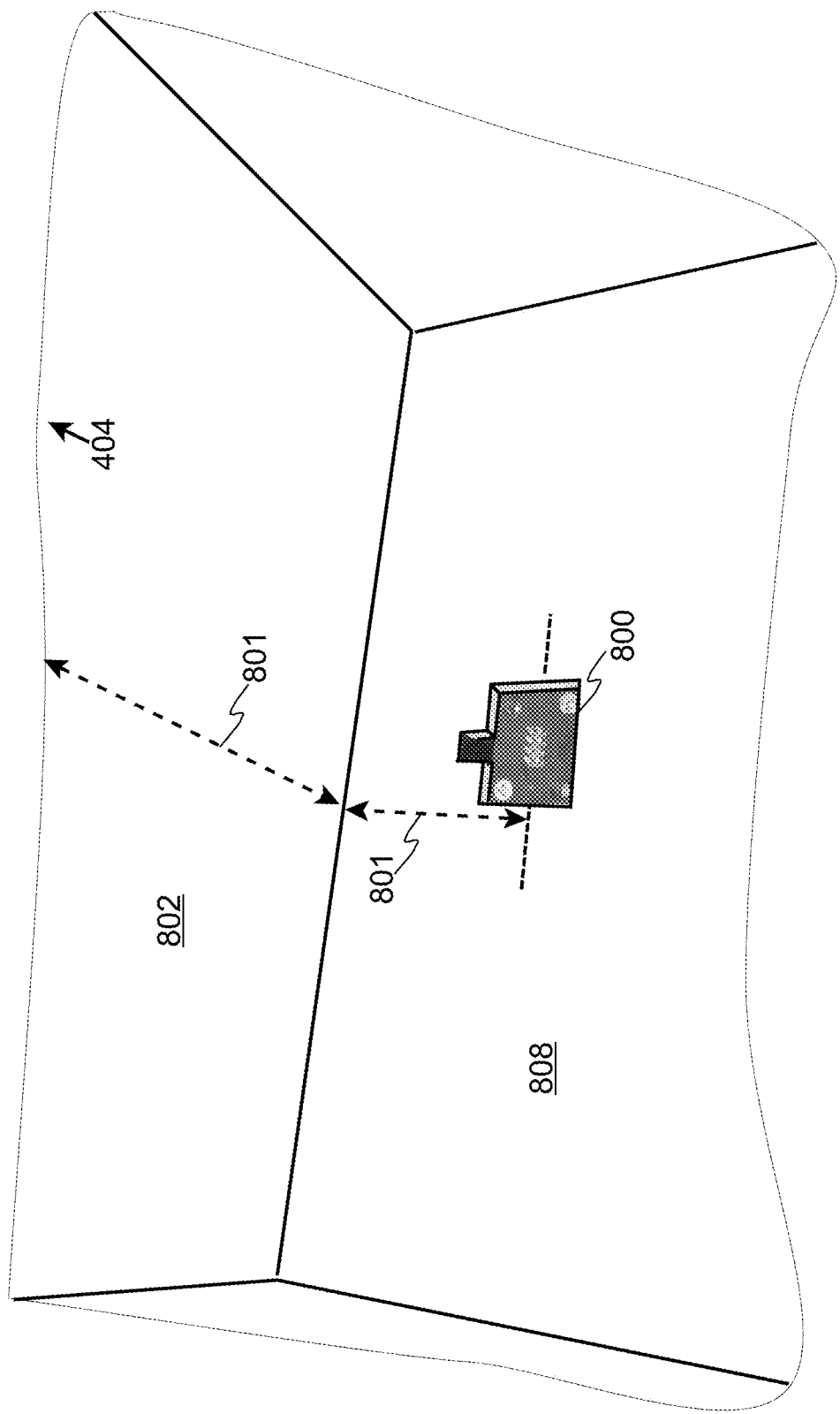
FIG. 8 illustrates the receiving mate for the quick disconnect/connect arrangement for the sensor signal to the tracking module.

In a corresponding recess (800) formed in the bottom (808) of the interior of the container, a mating connector was placed such that the connector on the bottom of the payload carrier would automatically orient and align with it as the payload carrier is lowered into the container, making electrical connection between the two as forced by the weight of the payload carrier and payload. Then, from that receiving connector, another flex cable was routed (801) across the bottom of the container, up the rear wall of the container to the lid hinge (404), as shown in FIG. 8, then around the hinge and along the bottom side of the lid (403) towards the tracking module, where it was terminated into the circuits of the tracking module. In the tested prototype, the mating connectors were provided with attracting magnetic components to further ensure strong mechanical connection between each pin and socket set.

Referring again to FIG. 5, the improved container (400) is shown with the lid (403) closed and the user interface of the tracking module (408) shown affixed or mounted in the corresponding corner near the magnet (407) disposed in the upper front edge of the container for the lid status detector.

In other embodiments, the sensor embedded in the payload carrier may connect using other means, such as optical (e.g., InfraRed Data Arrangement (IrDA)), wireless transmission, or a wired-through-connector configuration.

In still other embodiments, the container system may be provided with additional temperature sensors at additional locations for further confirmation of temperature management; a weight gate sensor which actively monitors and records the amount of payload placed inside and removed the container to detect potential tampering, theft, and changes in thermal load; shock and accelerometer(s) to detect when the payload may have been subjected to potentially damaging impacts; magnetometers; gyroscope; and hygrometers to help generate records which would indicate if the container system was maintained in its proper orientation for the entire period of storage or transportation. In most embodiments, the records created in the log may be time stamped and may optionally be marked with geographic positioning information, if equipped with a GPS subsystem.

In other embodiments, hand-offs from one courier to another may be recorded at the user interface, such as by entering a custodian code, scanning a barcode, or reading a Radio Frequency Identification (RFID) device outside the container system to create records of the chain of custody.

Predictive Visibility Enhancement

With reference to the foregoing device and system which is attached to or incorporated into a perishable good shipping container, embodiments of the present invention address the gap in visibility to potentially deteriorating conditions of the perishable good while in transit and/or while in storage, including but not limited to temperature changes within the container, temperature changes outside the container, shock on the container, vibration on the container, humidity inside the container, humidity outside the container, atmospheric pressure on the container, unexpected or unauthorized opening of the container, and other environmental conditions on the container. As depicted in FIG. 2, embodiments of the present invention may be useful in any of the phases (201-207) of the blood product collection, processing, distribution, and treatment cycle (200), and especially during phases that include storage or transportation (202-206).

Figure 11:
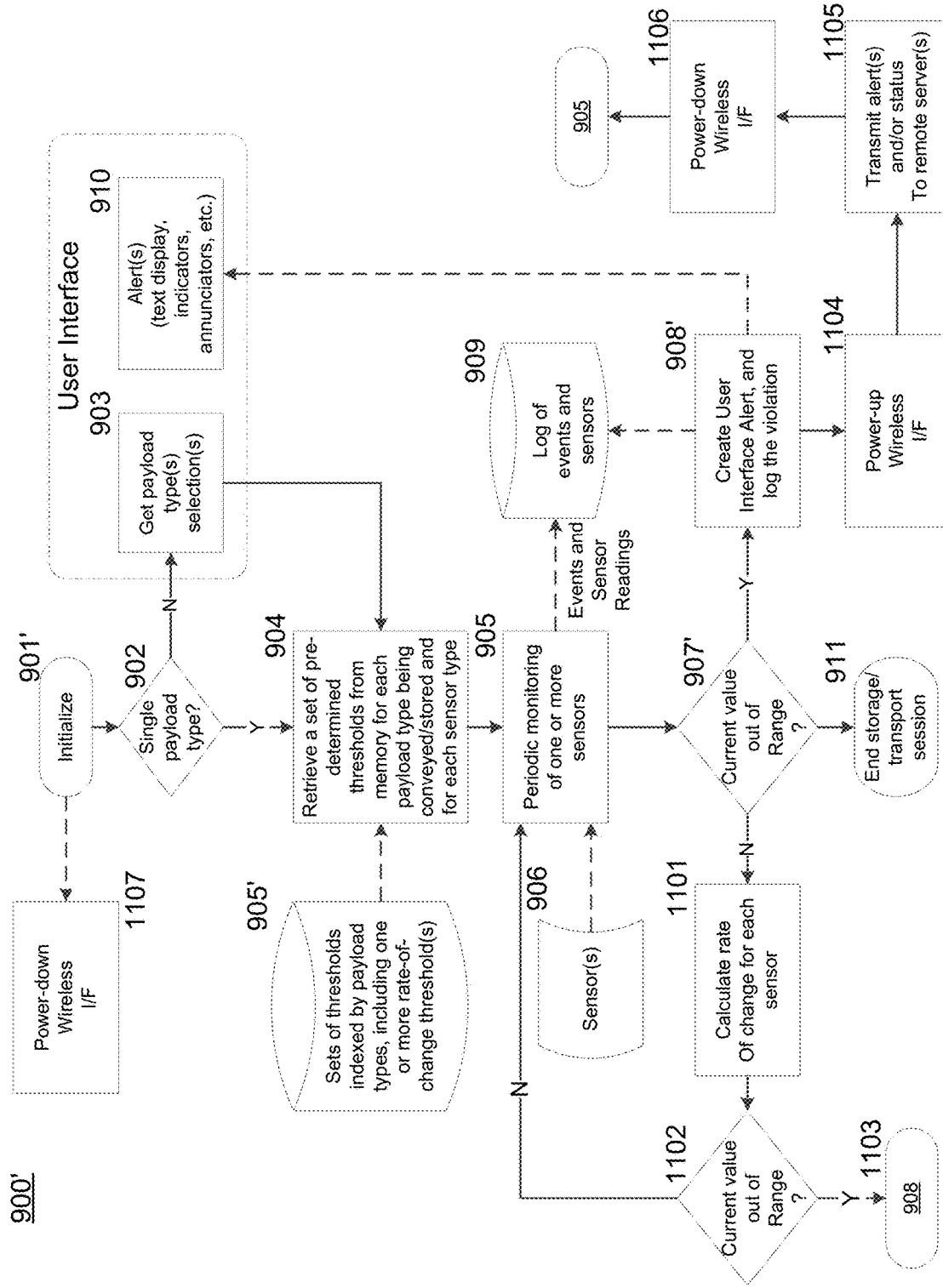
FIG. 11 sets forth exemplary enhancements to the logical process of FIG. 9 to gain insight into the visibility gap of FIG. 10, according to the present invention.

Further, according to this exemplary embodiment, the pre-determined sets of thresholds indexed by payload types are extended to include rate-of-change thresholds for one or more of the sensor(s) that are periodically monitored. Referring now to FIG. 11, which illustrates an improved logical process (900') for the electronic tracking module (408), in which the memory-stored sets of thresholds for each sensor (905') is extended to include one or more rate-of-change thresholds for at least one of the sensors, such as for at least one temperature sensor. The rate of change thresholds can be pre-determined, static values, and may, in some embodiments, be dynamically-determined rate of change thresholds, or a combination of both static pre-determined and dynamic thresholds. For example, instead of just a fixed value of N degrees-per-unit-time for a temperature sensor, a threshold could be dynamically calculated as a percentage of the current value per unit of time, e.g., +/−10% of current temperature per hour.

For example, since the exemplary containers are pre-validated for certain handling conditions, such as external temperatures ranging from 33 degrees Fahrenheit to 100 degrees Fahrenheit for up to 24 hours, an added rate-of-change threshold of 5 degrees increase per hour may be added. For even greater visibility and pre-emptive action taking, the rate-of-change thresholds may be related to particular ranges of the currently-sensed value, in order to escalate response when a condition is nearing out-of-tolerance situations, such as:

TABLE

Example Exterior Temperature $t_{ext}$ Thresholds

| Current $t_{ext}$ | Rate-of-Change | |
|---|---|---|
| $t_{ext} \leq 32$ degrees | N/A | EQ. 1 |
| $33 \leq t_{ext} < 48$ | −5 degrees per hour (falling) | EQ. 2 |
| $48 \leq t_{ext} < 84$ | |22| degrees per hour | EQ. 3 |
| $85 \leq t_{ext} < 100$ | +5 degrees per hour (rising) | EQ. 4 |
| $100 < t_{ext}$ | N/A | EQ. 5 |

In this exemplary table, the first range EQ. 1 represents an already-out-of-limit exterior temperature, so rate-of-change is irrelevant because the condition of the payload is now suspect. The second range EQ. 2 represents an acceptable exterior temperature, at least for now, but if it is falling at a rate of 5 degrees or more per hour, it may be out-of-limit within 3 hours, i.e., less than 32 degrees, if it continues at this rate of fall. The third range EQ. 3 represents a middle range which is currently acceptable, but if the exterior temperature is detected to be falling or rising at 22 degrees or more per hour it will be out-of-limit within 3 hours. The fourth range EQ.4 represents a portion of the acceptable range, but near the upper limit, so a rate of change of 5 degrees or more rise per hour would put it out-of-limit within 3 hours. Finally, the fifth range EQ. 5 is already outside the acceptable limits, so the rate of change is irrelevant. The actual values shown here are not suggested for any particular payload type or any particular design and construction of an insulated container, but they are used to illustrate a banded set of rate-of-change thresholds for predicting an out-of-limit condition within a pre-determined period of time, i.e. 3 hours in this example. This provides a possible 3-hour predictive lead time to take corrective or a ameliorative action, such as checking air conditioning, re-routing a shipment, or even dispatching a replacement payload via an alternative route, carrier, or from an alternative source, etc.

In this improved logical process, after the current value is checked (907') for in-range status, the rate of change for one or more sensors may be calculated or updated (1101), and each rate of change is checked against a RoC threshold (905'). If a rate of change is determined (1102) to be greater than can be tolerated within the corrective action timeframe, a user alert may be created (908'), and an on-board wireless interface (1104) may be powered-up so that a status or alert can be transmitted (1105) to a remote server.

Because minimal battery size is desirable, from size, weight, cost and safety perspectives, at least one embodiment according to the present invention includes powering (1105) down the wireless interface upon completion of communications with the remote server, and optionally, initializing (901') the wireless interface in a powered-down state. Wireless communications consume considerable energy, whether short range such as Bluetooth Low Energy (BLE), Zigby™, etc., or longer range such as WiFi or cellular data. Modulating the power status of the wireless interface can save significant battery energy, thereby reducing the size, cost and weight of a particular battery for a particular maximum storage or transit time (days to weeks).

As previously mentioned with regard to FIG. 1, a suitable wireless interface (107) in the prototype included a Bluetooth Low Energy (BLE) interface for communication to a local device such as a cellular phone or a tablet computer, and it also included a cellular data network interface. The particular interface device employed in the prototype was a SIMCOM™ SIM7000-A LTE CAT-M1 and NB-IoT module with integrated global positioning system ("GPS") paired with a Pulse Electronics Corporation™ flexible strip antenna. Other embodiments may utilize other GPS, wireless data network interface devices and antennas. In this manner, the precise GPS position of a container can be reported to a remote server.

By providing a power-regulated wireless interface in this manner, a data logger or conditions monitor device attached to or included in a perishable product shipping container is improved to provide advance reports of changes in environmental conditions which may be indicative of future violations of storage and shipping thresholds, thereby allowing for potential preemptive ameliorative actions to be taken as determined necessary by one or more remote services, such as cloud-based computing services.

In another embodiment according to the present invention, if a plurality of containers are grouped or packaged together such as being palletized, the relative position of each container in the group can be entered using the user interface of each container upon packing. Then, if an alert is sent by the system to a remote server during transit or during storage, the container can report its GPS location as well as its relative position within the group of containers.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method of tracking and monitoring a status of a payload of a shipping container using a tracking module comprising:
   receiving, by the tracking module, at least one signal from one or more sensors associated with the shipping container, associated with the payload, or associated with both the shipping container and the payload, wherein the tracking module is physically associated with the shipping container;
   determining, by the tracking module, a rate of change over time for the received at least one signal;
   comparing, by the tracking module, in real-time, one or more memory-stored rate-of-change thresholds corresponding to a payload type of the payload of the shipping container to the determined rate of change of the received at least one signal;
   responsive to the comparison indicating a current or impending violation of a payload handling condition:
   commanding, by the tracking module, a wireless communications interface of the tracking module into a powered up mode;
   communicating, by the tracking module, via the powered-up wireless communications interface, to a remote computing system, a digital report of the current or impending violation;
   commanding, by the tracking module, the wireless communications interface into a powered down mode, while continuing the receiving of the at least one signal from the one or more sensors;
   thereby avoiding power consumption by the wireless communications interface except when the current or impending violation is indicated by the comparing.

2. The method as set forth in claim 1 wherein the communicating of the digital report further comprises outputting, by the tracking module, a corresponding user alert to a user interface device of the tracking module.

3. The method as set forth in claim 1 wherein at least one of the one or more sensors is affixed at a pre-determined position proximal to an interior payload volume of the payload of the shipping container.

4. The method as set forth in claim 1 wherein the at least one signal from the one or more sensors comprises a signal from the one or more sensors selected from the group consisting of a temperature sensor, an accelerometer, a hygrometer, a shock sensor, a magnetometer, and an access panel open/close status sensor.

5. The method as set forth in claim 1 wherein the payload type consists of at least one payload type selected from the group consisting of whole blood for transport, whole blood for storage, platelet concentrates for transport, platelet concentrates for storage, fresh frozen plasma for transport, fresh frozen plasma for storage, packed red cells for transfusion, and thawed plasma for transfusion.

6. The method as set forth in claim 1 wherein the one or more memory stored rate-of-change thresholds correspond to one or more threshold values selected from the group consisting of temperature, humidity, weight, acceleration, deceleration, light, maximum sample period, minimum sample rate, accrued time in storage, accrued time in transit, a maximum access panel open time, and a maximum number of access panel openings before declaring a tampered payload.

7. The method as set forth in claim 1 wherein the tracking module further comprises a plurality of second through n-th sets of memory-stored pre-determined rate-of-change thresholds corresponding to second through n-th payload types.

8. The method as set forth in claim 1 wherein the one or more memory-stored rate-of-change thresholds comprise one or more pre-determined rate-of-change thresholds.

9. The method as set forth in claim 1 wherein the one or more memory-stored rate-of-change thresholds comprise one or more dynamically determined rate-of-change thresholds.

10. The method as set forth in claim 1 wherein the digital report further comprises one or more location criteria selected from the group consisting of a geographic position, and a relative position within a multi-container shipment.

11. A tracking module for tracking and monitoring a status of a payload of a shipping container comprising:
    a computer processor of a tracking module for executing program instructions; and
    a non-transitory computer-readable memory device having the program instructions embodied therein for causing the computer processor, when executed, to perform steps comprising:
    receiving at least one signal from one or more sensors associated with the shipping container, associated with the payload, or associated with both the shipping container and the payload, wherein the tracking module is physically associated with the shipping container;
    determining a rate of change over time for the received at least one signal;
    comparing in real-time, one or more memory-stored rate-of-change thresholds corresponding to a payload type of the payload of shipping container to the determined rate of change of the received at least one signal;
    responsive to the comparison indicating a current or impending violation of a payload handling condition:
    commanding a wireless communications interface of the tracking module into a powered up mode;
    communicating via the powered-up wireless communications interface, to a remote computing system, a digital report of the current or impending violation; and
    commanding the wireless communications interface into a powered down mode, while continuing the receiving of the at least one signal from the one or more sensors;

thereby avoiding power consumption by the wireless communications interface except when the current or impending violation is indicated by the comparing.

12. The system as set forth in claim 11 wherein the communicating of the digital report further comprises outputting, by the tracking module, a corresponding user alert to a user interface device of the tracking module.

13. The system as set forth in claim 11 wherein at least one of the one or more sensors is affixed at a pre-determined position proximal to an interior payload volume of the payload of the shipping container.

14. The system as set forth in claim 11 wherein the at least one signal from the one or more sensors comprises a signal from the one or more sensors selected from the group consisting of a temperature sensor, an accelerometer, a hygrometer, a shock sensor, a magnetometer, and an access panel open/close status sensor.

15. The system as set forth in claim 11 wherein the payload type consists of at least one payload type selected from the group consisting of whole blood for transport, whole blood for storage, platelet concentrates for transport, platelet concentrates for storage, fresh frozen plasma for transport, fresh frozen plasma for storage, packed red cells for transfusion, and thawed plasma for transfusion.

16. The system as set forth in claim 11 wherein the one or more memory stored rate-of-change thresholds correspond to one or more threshold values selected from the group consisting of temperature, humidity, weight, acceleration, deceleration, light, maximum sample period, minimum sample rate, accrued time in storage, accrued time in transit, a maximum access panel open time, and a maximum number of access panel openings before declaring a tampered payload.

17. The system as set forth in claim 11 wherein the tracking module further comprises a plurality of second through n-th sets of memory-stored pre-determined rate-of-change thresholds corresponding to second through n-th payload types.

18. The system as set forth in claim 11 wherein the one or more memory-stored rate-of-change thresholds comprise one or more pre-determined rate-of-change thresholds.

19. The system as set forth in claim 11 wherein the one or more memory-stored rate-of-change thresholds comprise one or more dynamically determined rate-of-change thresholds.

20. The system as set forth in claim 11 wherein the digital report further comprises one or more location criteria selected from the group consisting of a geographic position, and a relative position within a multi-container shipment.

\* \* \* \* \*